US009168709B2

(12) United States Patent
Marchini

(10) Patent No.: US 9,168,709 B2
(45) Date of Patent: Oct. 27, 2015

(54) PROCESS AND APPARATUS FOR MANUFACTURING TYRES FOR VEHICLE WHEELS

(71) Applicant: Pirelli Tyre S.p.A., Milan (IT)

(72) Inventor: Maurizio Marchini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 28 days.

(21) Appl. No.: 13/930,886

(22) Filed: Jun. 28, 2013

(65) Prior Publication Data

US 2013/0319617 A1 Dec. 5, 2013

Related U.S. Application Data

(62) Division of application No. 13/139,242, filed as application No. PCT/IB2008/003422 on Dec. 11, 2008, now Pat. No. 8,512,495.

(51) Int. Cl.
*B29D 30/30* (2006.01)
*B29D 30/06* (2006.01)
(Continued)

(52) U.S. Cl.
CPC ........ *B29D 30/0681* (2013.01); *B29D 30/1657* (2013.01); *B29D 30/3057* (2013.01); *B29D 30/70* (2013.01); *B29D 2030/1685* (2013.01);
(Continued)

(58) Field of Classification Search
CPC ............. B29D 2030/1685; B29D 2030/3085; B29D 30/0861; B29D 30/46; B29D 2030/463
USPC ................. 156/121, 131, 135, 397, 398, 403, 156/406.4
See application file for complete search history.

(56) References Cited

U.S. PATENT DOCUMENTS 3,904,471 A 9/1975 Kubinski
4,148,680 A * 4/1979 Harding ........................ 156/403
(Continued)

FOREIGN PATENT DOCUMENTS

CN 101304871 11/2008
DE 4316071 * 11/1994 ............. B29D 30/18
(Continued)

OTHER PUBLICATIONS

Machine generated English language translation of DE 4316071 (original document dated Nov. 1994).*
(Continued)

*Primary Examiner* — Martin Rogers
(74) *Attorney, Agent, or Firm* — Finnegan, Henderson, Farabow, Garrett & Dunner, L.L.P.

(57) ABSTRACT

Building a carcass structure of a tire for vehicle wheels includes associating, at each end edge of a carcass ply laying on a forming support, at least one respective annular reinforcing structure obtained by depositing at least one respective reinforcing element. The deposition process includes feeding a continuous reinforced band-like element at a cutting unit, cutting to size at least one first reinforcing element from the continuous reinforced band-like element, moving the first reinforcing element from the cutting unit toward a first end edge of the carcass ply, positioning the first reinforcing element on the first end edge, cutting to size at least one second reinforcing element from the continuous reinforced band-like element, moving the second reinforcing element from the cutting unit toward a second end edge of the carcass ply opposite said first end edge, and positioning the second reinforcing element on the other end edge.

17 Claims, 7 Drawing Sheets

(51) Int. Cl.
   *B29D 30/16* (2006.01)
   *B29D 30/70* (2006.01)

(52) U.S. Cl.
   CPC . *B29D 2030/3085* (2013.01); *B29D 2030/3092* (2013.01); *B29D 2030/705* (2013.01); *Y10T 156/1075* (2015.01)

(56) References Cited

U.S. PATENT DOCUMENTS

| | | | | |
|---|---|---|---|---|
| 5,449,212 | A | * | 9/1995 | Seifert .......................... 296/57.1 |
| 6,328,835 | B1 | * | 12/2001 | Kobayashi .................... 156/111 |
| 6,355,126 | B1 | | 3/2002 | Ogawa |
| 6,379,493 | B1 | | 4/2002 | Berning et al. |
| 7,008,495 | B2 | | 3/2006 | Mancini |
| 2004/0011454 | A1 | * | 1/2004 | Mancini ........................ 156/130 |
| 2006/0124226 | A1 | | 6/2006 | Gutknecht |
| 2006/0130958 | A1 | | 6/2006 | Mizota |
| 2008/0053595 | A1 | * | 3/2008 | Hrycyk et al. ................ 156/136 |
| 2009/0250156 | A1 | | 10/2009 | Bigogno et al. |
| 2010/0101704 | A1 | * | 4/2010 | Amurri et al. ................ 156/123 |

FOREIGN PATENT DOCUMENTS

| | | | | |
|---|---|---|---|---|
| EP | 0563195 | * | 10/1993 | ............ B29D 30/48 |
| EP | 0928680 | | 7/1999 | |
| EP | 0956940 | | 11/1999 | |
| EP | 1211058 | | 6/2002 | |
| JP | 2004-261965 | | 9/2004 | |
| JP | 2006-205769 | | 8/2006 | |
| WO | WO 2004/056558 | | 7/2004 | |
| WO | WO 2005-065923 | * | 7/2005 | ............ B29D 30/06 |
| WO | WO 2005-087481 | * | 9/2005 | ............ B29D 30/46 |
| WO | WO 2006-064525 | * | 6/2006 | ............ B29D 30/08 |
| WO | WO 2007/138374 | | 12/2007 | |

OTHER PUBLICATIONS

International Search Report issued Aug. 27, 2009 by European Patent Office in corresponding International Application No. PCT/IB2008/003422.

Office Action issued May 23, 2013 in counterpart Chinese Application No. 200880132291.2 from the State Intellectual Property Office of the People's Republic of China.

* cited by examiner

PROCESS AND APPARATUS FOR MANUFACTURING TYRES FOR VEHICLE WHEELS

CROSS REFERENCE TO RELATED APPLICATION

This application is a division of U.S. application Ser. No. 13/139,242, filed Jun. 10, 2011, which is a national stage application of PCT/IB2008/003422, filed Dec. 11, 2008, both of which are incorporated herein by reference.

BACKGROUND OF THE INVENTION

1. Field of the Invention

The present invention relates to a process for manufacturing tyres for vehicle wheels.

The invention further relates to an apparatus for the deposition of an annular reinforcing structure in the building step of a carcass structure of a tyre for vehicle wheels, said apparatus being usable in carrying out the aforementioned process.

2. Description of the Related Art

A tyre for vehicle wheel generally comprises a carcass structure comprising at least one carcass ply comprised of reinforcing cords incorporated in an elastomeric matrix. The carcass ply has end edges respectively engaged with annular anchoring structures arranged in the zones usually identified with the name of "beads" and normally consisting each of a substantially circumferential annular insert on which at least one filling insert is applied, in a radially outer position thereof. Such annular structures are commonly identified as "bead cores" and have the task of keeping the tyre well fixed to the anchoring seat specifically provided in the rim of the wheel, thus preventing, in operation, the radially inner end edge of the tyre coming out from such seat.

At the beads specific reinforcing structures may be provided having the function of improving the torque transmission to the tyre. The region of the bead, indeed, is particularly active in the torque transmission from the rim to the tyre in acceleration and braking, and therefore the provision of appropriate reinforcing structures in such an area ensures that the torque transmission occurs with the maximum possible reactivity.

In a radially outer position with respect to the carcass ply, a belt structure comprising one or more belt layers is associated, said belt layers being arranged radially one on top of the other and having textile or metal reinforcing cords with crossed orientation and/or an orientation substantially parallel to the direction of circumferential extension of the tyre.

Between the carcass structure and the belt structure a layer of elastomeric material, known as "under-belt", can be provided, said layer having the function of making the radially outer surface of the carcass structure as uniform as possible for the subsequent application of the belt structure.

In a radially outer position with respect to the belt structure a tread band is applied, also made from elastomeric material, as well as other structural elements making up the tyre.

Between the tread band and the belt structure a so-called "under-layer" of elastomeric material can be arranged, said layer having properties suitable to ensure a steady union of the tread band itself.

On the side surfaces of the carcass structure respective sidewalls of elastomeric material are also applied, each extending from one of the side edges of the tread band up to the respective annular anchoring structure to the beads.

Throughout the present description and in the following claims, the term "reinforcing element" is used to indicate a cut to size element comprising one or more thread-like reinforcing elements substantially parallel to one another, such as textile or metal cords, embedded in, or coated with, a layer of elastomeric material.

The term: "elastomeric material" on the other hand is used to indicate a composition comprising at least one elastomeric polymer and at least one reinforcing filler. Preferably, such a composition further comprises additives such as, for example, a cross-linking agent and/or a plasticizer. Thanks to the provision of the cross-linking agent, such material can be cross-linked by heating, so as to make the end product.

The traditional processes for manufacturing tyres for vehicle wheels essentially provide for the components of the tyre listed above to be first made separately from one another, to be then assembled in a subsequent building step of the tyre.

However, the current tendency is that of using manufacturing processes that allow the production and storage of semi-finished parts to be minimised or possibly eliminated. In such processes, each component of the tyre is directly formed on a forming support, for example as illustrated in EP 0 928 680 in the name of the same Applicant.

More specifically, attention has now turned towards process solutions that allow the individual components of the tyre to be made by directly applying them, according to a predetermined sequence, onto the tyre being built on a forming support, typically toroidal or cylindrical.

JP 2006-205769 describes a process for manufacturing a reinforcing structure of the bead region of the tyre, wherein such a reinforcing structure is obtained in the form of a strip by reciprocally joining a plurality of reinforcing elements obtained cutting to size band-like pieces of a continuous band-like element which incorporates metal reinforcing elements. According to an embodiment described in the aforementioned document, a sheet of elastomeric material is made by arranging a plurality of cords in the same direction and coating them with elastomeric material. Said sheet is then repeatedly cut along the direction of the cords to obtain band-like pieces having a parallelogram shape. A ring-shaped sheet of reinforcing material is then formed by sequentially attaching each band-like piece along a circumference defined on a side surface of a tyre being formed in toroidal configuration, the band-like piece being deformed in such a way that the length of an outer peripheral portion of the sheet of reinforcing material forms a curve arc longer than the length of the inner peripheral portion of the sheet of reinforcing material. The same document illustrates an embodiment wherein each band-like piece is attached, without being deformed, to a portion defined on the same circumference corresponding to the portion of the bead of the tyre being formed in toroidal configuration.

Patent application published as WO 2007/138374, in the name of the same Applicant, describes a process for manufacturing a tyre for vehicle wheels wherein the reinforcing structure is formed by depositing a plurality of reinforcing elements along a curvilinear deposition path defined at each end edge of a carcass ply laying on a toroidal support. The reinforcing elements are obtained cutting to size band-like pieces of a continuous reinforced element and deforming these band-like pieces according to the bending of the portion of the deposition path where they will actually be deposited.

U.S. Pat. No. 6,379,493 describes an apparatus for carrying reinforcing elements previously cut from a continuous band-like reinforced element and depositing them on a forming support. The apparatus comprises two opposite arms, each provided, at the respective free end thereof, with a plurality of needles adapted to penetrate the reinforcing element for moving it up to the forming support, where it is then deposited. The needles are movable along respective longitudinal directions for allowing the pick up and the release of the reinforcing elements. The arms are mounted on a crosspiece sliding towards and away from the forming support, along a direction tangential to the forming support. Such arms are rotatable around respective rotation axes so as to be lifted during the movement of the crosspiece away from the forming support and so as to be lowered again for picking up the reinforcing element and moving it towards the forming support for the subsequent deposition.

The Applicant has noted that in the processes described in the aforementioned patent applications WO 2007/138374 and JP 2006-205769, deposition of the reinforcing elements occurs first at an end edge of the carcass ply and, only after the reinforcing structure at such end edge has been completed, deposition of the reinforcing elements begins at the other end edge, so as to form a reinforcing structure also at this other end edge. In the process described in U.S. Pat. No. 6,379,493, on the other hand, deposition of the reinforcing elements is carried out simultaneously on opposite end edges of the carcass ply, working in parallel through two separate pivoted arms.

SUMMARY OF THE INVENTION

The Applicant has felt the need of completing the deposition of the reinforcing elements on both end edges of the carcass ply within a maximum predetermined time, so as to synchronise the forming step of the reinforcing structures with the previous and subsequent steps of the building process of the carcass structure and, then, with the step of making the crown structure (comprising at least one belt structure), thus minimising the overall time for manufacturing the tyre.

The Applicant has noted that this is particularly important for example in a manufacturing process wherein the building steps of the carcass structure are carried out at least in part simultaneously with the steps of making the crown structure at respective separate work stations from where the respective products must then come out with a time which should be as synchronised as possible, so as to proceed with the subsequent step of assembling the crown structure on the carcass structure and then, with the subsequent steps of the process for manufacturing the tyre.

The Applicant has also felt the need of making the aforementioned reinforcing structures by a process which should ensure both wide flexibility margins in operation with respect to the positioning, size and cutting angle of the reinforcing elements, and high reliability in terms of accuracy and repeatability of the reciprocal positioning of the various reinforcing elements on the end edge of the carcass ply, all within a maximum predetermined time, so as to ensure a deposition as planned and ensure increasingly higher quality and performance levels of the tyre with very low manufacturing time.

In this respect, the Applicant has verified the maximum number of reinforcing elements intended to form the reinforcing structure at each end edge of the carcass ply in the most unfavourable deposition configuration with respect to the deposition time (corresponding to a deposition of reinforcing elements with a cutting angle substantially perpendicular to the reinforcing cords which are in the same reinforcing element) and has calculated the maximum time by which each reinforcing element must be deposited so as to complete both reinforcing structures with the desired synchronisation in any possible deposition configuration.

The Applicant has finally found that by:
dividing the deposition process of each reinforcing element at each end edge of the carcass ply into a plurality of separate steps;
carrying out, by a single apparatus, a sequential deposition of the reinforcing elements alternately on both end edges of the carcass ply; and
carrying out at least one of the steps required for depositing a reinforcing element at an end edge at least in part simultaneously with at least one different step among those required for depositing a reinforcing element at the other end edge;
it is advantageously possible to achieve a reduction of the overall time for making the reinforcing structures on the two opposite end edges of the carcass ply and thus, of the overall time for manufacturing the tyre.

In a first aspect thereof, the present invention therefore relates to a process for manufacturing tyres for vehicle wheels, comprising the step of building a carcass structure on a forming support, the carcass structure comprising at least one carcass ply associated, at axially opposite end edges thereof, to respective annular anchoring structures, wherein the step of building the carcass structure comprises the step of associating at least one first annular reinforcing structure at a first end edge of the carcass ply and at least one second annular reinforcing structure at a second end edge of the carcass ply, each annular reinforcing structure being obtained by depositing at least one respective reinforcing element, wherein the step of depositing the respective reinforcing elements comprises the steps of:
feeding a continuous reinforced band-like element at a cutting unit by moving the continuous reinforced band-like element by a first distance having a length equal to a predetermined advance step;
cutting to size at least one first reinforcing element from the continuous reinforced band-like element;
moving the first reinforcing element from the cutting unit towards the first end edge of the carcass ply;
positioning the first reinforcing element on said first end edge;
moving the continuous reinforced band-like element by a second distance having a length equal to the predetermined advance step;
cutting to size at least one second reinforcing element from the continuous reinforced band-like element;
moving the second reinforcing element from the cutting unit towards the second end edge of the carcass ply opposite said first end edge;
positioning the second reinforcing element on said second end edge;
wherein at least one of the steps carried out for depositing the first reinforcing element is carried out at least in part simultaneously with at least part of a different step carried out for depositing the second reinforcing element.

The Applicant has verified that, operating as described above, wide margins of flexibility with respect to the positioning, size and cutting angle of the reinforcing elements are guaranteed, along with a high process reliability, at the same time achieving the desired reduction of the overall time for making the annular reinforcing structures on the two opposite end edges of the carcass ply and thus, of the overall time for manufacturing the carcass structure, the synchronisation with the time for making the respective crown structure of the tyre being thus easier.

In a second aspect thereof, the present invention relates to an apparatus for depositing an annular reinforcing structure in the building step of a carcass structure of a tyre for vehicle wheels, the carcass structure comprising at least one carcass ply associated, at axially opposite end edges thereof, to respective annular anchoring structures, said at least one carcass ply laying on a forming support, the apparatus comprising:
- a device for feeding a continuous reinforced band-like element;
- a cutting unit of the continuous reinforced band-like element;
- a device for picking up at least one reinforced element cut to size from the continuous reinforced band-like element, the pick up device being alternately movable in both directions around a respective rotation axis for sequentially moving at least one first reinforcing element from the cutting unit towards a first end edge of the carcass ply and at least one second reinforcing element from the cutting unit towards a second end edge of the carcass ply opposite said first end edge;
- a first positioning member adapted to take the first reinforcing element from the pick up device and deposit it on the first end edge of the carcass ply;
- a second positioning member adapted to take the second reinforcing element from the pick up device and deposit it on the second end edge of the carcass ply.

Advantageously, such apparatus can be used for carrying out the process discussed above, therefore allowing the advantageous results mentioned above to be achieved. The aforementioned apparatus thus carries out the deposition of the reinforcing elements sequentially on the opposite end edges of the carcass ply by alternately moving from one end edge to the other, thus allowing the simultaneity of some of the process steps described above.

The present invention, in at least one of the aforementioned aspects thereof, can comprise at least one of the following preferred features, taken individually or in combination with the others.

Preferably, each of the steps carried out for depositing the second reinforcing element is carried out simultaneously with at least one different step carried out for depositing the first reinforcing element. An even more advantageous reduction of the overall time for making the reinforcing structures on the two opposite end edges of the carcass ply is thus obtained.

In the preferred embodiments of the present invention, the step of cutting to size the second reinforcing element is carried out at least in part simultaneously with at least part of the step of positioning the first reinforcing element on the first end edge of the carcass ply.

More preferably, the whole step of cutting to size the second reinforcing element is carried out simultaneously with part of the step of positioning the first reinforcing element on the first end edge of the carcass ply.

Advantageously, therefore, the cut of a reinforcing element intended to be deposited on an end edge of the carcass ply takes places in the same space of time in which the reinforcing element previously cut is moved for being deposited on the other end edge of the carcass ply. The simultaneity of these two steps contributes to the desired reduction of the overall time for making the annular reinforcing structures on the two opposite end edges of the carcass ply.

Always in preferred embodiments of the present invention, the step of moving the continuous reinforced band-like element of a second distance is carried out at least in part simultaneously with at least part of the step of moving the first reinforcing element from the cutting unit towards the first end edge of the carcass ply.

More preferably, at least part of the step of moving the continuous reinforced band-like element of a second distance is carried out simultaneously with the whole step of moving the first reinforcing element from the cutting unit towards the first end edge of the carcass ply.

Advantageously, therefore, the movement of a reinforcing element towards an end edge of the carcass ply for the subsequent positioning takes places in the same space of time in which the continuous reinforced band-like element is made to advance in order to allow a new reinforcing element to be cut, the new reinforcing element being then intended to be deposited on the other end edge of the carcass ply. The simultaneity of these two steps contributes to the desired reduction of the overall time for making the annular reinforcing structures on the two opposite end edges of the carcass ply.

In the preferred embodiments of the present invention, an initial part of the step of moving the second reinforcing element from the cutting unit towards the second end edge of the carcass ply is carried out simultaneously with an end part of the step of positioning the first reinforcing element on the first end edge of the carcass ply.

Advantageously, therefore, while the deposition of a reinforcing element on an end edge of the carcass ply is completed, the continuous reinforced band-like element is advanced to allow a new reinforcing element that will then be deposited on the other end edge of the carcass ply to be cut. The partial simultaneity of these two steps contributes to the desired reduction of the overall time for making the annular reinforcing structures on the two opposite end edges of the carcass ply.

Preferably, the above process further comprises, after the positioning of the first reinforcing element on the first end edge of the carcass ply, the step of pressing the first reinforcing element by a first pressing member. Such a provision advantageously allows the adhesion of the reinforcing element on the respective end edge to be improved, thus allowing the reinforcing element to perfectly adhere at all the surface portions thereof. The Applicant has found that this is especially advantageous since, due to the length of the reinforcing element, it may have raised end portions once deposited.

Preferably, each pressing member comprises a plurality of spring elements. These are adapted to match the curved surface of the forming support so as to ensure the perfect adhesion of the reinforcing element on the end edge of the carcass ply.

Preferably, each pressing member is movable along a direction perpendicular to a rotation axis of the forming support. Such movement allows the above pressing step to be carried out as well as the positioning the pressing member in the proper radial position.

More preferably, each pressing member is movable along a direction parallel to a rotation axis of the forming support. This provision allows the pressing member to be positioned in the proper axial position.

In the preferred embodiments of the present invention, the following steps are carried out after the step of cutting to size the second reinforcing element:
- moving the continuous reinforced band-like element by a third distance having a length equal to the predetermined advance step;
- cutting to size a further first reinforcing element from the continuous reinforced band-like element;
- moving said further first reinforcing element from the cutting unit towards the first end edge of the carcass ply;
- rotating the forming support about a rotation axis thereof by a predetermined angle corresponding to a movement, in a circumferential direction, by a distance having a length at least equal to the advance step of the continuous reinforced band-like element;

positioning said further first reinforcing element on the first end edge of the carcass ply.

Preferably, the rotation of the forming support is carried out during an initial part of the step of positioning said further first reinforcing element on the first end edge of the carcass ply.

Advantageously, therefore, the rotation of the forming support takes place in the same space of time in which the positioning step of a reinforcing element on an end edge of the carcass ply begins. The simultaneity of these two steps contributes to the desired reduction of the overall time for making the annular reinforcing structures on the two opposite end edges of the carcass ply.

Preferably, the step of pressing the first reinforcing element is carried out at least in part simultaneously with at least a part of the step of moving the further first reinforcing element from the cutting unit towards the first end edge of the carcass ply.

Advantageously, therefore, the pressing of a reinforcing element against the respective end edge of the carcass ply takes places in the same space of time in which the reinforcing element is moved towards the same end edge of the carcass ply. The simultaneity of these two steps contributes to the desired reduction of the overall time for making the annular reinforcing structures on the two opposite end edges of the carcass ply.

In the particularly preferred embodiments of the present invention, after the positioning of the second reinforcing element on the second end edge of the carcass ply, the step of pressing the second reinforcing element by a second pressing member is carried out. Such second pressing member preferably is totally similar to the first pressing member.

In particularly preferred embodiments of the present invention, the following steps are carried out after the step of cutting to size the further first reinforcing element:
  moving the continuous reinforced band-like element by a fourth distance having a length equal to the predetermined advance step;
  cutting to size a further second reinforcing element from the continuous reinforced band-like element;
  moving said further second reinforcing element from the cutting unit towards the second end edge of the carcass ply;
  rotating the forming support about a rotation axis thereof by a predetermined angle corresponding to a movement, in a circumferential direction, by a distance having a length at least equal to the advance step of the continuous reinforced band-like element;
  positioning said further second reinforcing element on the second end edge of the carcass ply.

In a way totally similar to what happens for the first reinforcing element, preferably, the step of pressing the second reinforcing element is carried out at least in part simultaneously with at least part of the step of moving the further second reinforcing element from the cutting unit towards the second end edge of the carcass ply.

The simultaneity of these two steps contributes to the desired reduction of the overall time for making the annular reinforcing structures on the two opposite end edges of the carcass ply.

Moreover, preferably, the step of pressing the first reinforcing element is carried out at least in part simultaneously with at least part of the step of moving the continuous reinforced band-like element by a fourth distance. Advantageously, therefore, the pressing of a reinforcing element towards the respective end edge of the carcass ply takes places in the same space of time in which the continuous reinforced band-like element is made to advance in order to allow a new reinforcing element to be cut, such a new reinforcing element being intended to be deposited on the other end edge of the carcass ply. The simultaneity of these two steps contributes to the desired reduction of the overall time for making the annular reinforcing structures on the two opposite end edges of the carcass ply.

Preferably, the step of moving the first reinforcing element from the cutting unit towards the first end edge of the carcass ply comprises the step of picking up, by a first pick up member, the first reinforcing element from the cutting unit and moving it up to a respective first operating position wherein the first pick up member gives the first reinforcing element to a first positioning member.

Likewise, the step of moving the second reinforcing element from the cutting unit towards the second end edge of the carcass ply preferably comprises the step of picking up, by a second pick up member, the second reinforcing element from the cutting unit and moving it up to a respective first operating position wherein the second pick up member gives the second reinforcing element to a second positioning member.

More preferably, the step of positioning the first reinforcing element on said first end edge comprises the steps of:
  moving, by the first positioning member, the first reinforcing element from said respective first operating position to a respective second operating position defined at the first end edge of the carcass ply;
  depositing the first reinforcing element on said first end edge.

Likewise, the step of positioning the second reinforcing element on said second end edge preferably comprises the steps of:
  moving, by the second positioning member, the second reinforcing element from said respective first operating position to a respective second operating position at the second end edge of the carcass ply;
  depositing the second reinforcing element on said second end edge.

Preferably, said process further comprises the step of tilting by 180° one among said at least one first and at least one second reinforcing element during the movement from the cutting unit respectively towards the first end edge of the carcass ply and the second end edge of the carcass ply. This provision advantageously allows the reinforcing elements deposited at one end edge of the carcass ply to be in a mirror-like and symmetrical position with respect to the reinforcing elements deposited at the opposite end edge. Indeed, this is the desired positioning of the reinforcing elements.

In the preferred embodiments of the present invention, the device for picking up the reinforcing elements comprises two arms rigidly connected to one another and angularly spaced by a predetermined angle.

Even more preferably, said angle is substantially equal to 90°. Such a structural feature allows that while one of the above arms moves towards the cutting unit for picking up a reinforcing element intended to be deposited on one end edge of the carcass ply, the other arm that has already picked up a previously: cut reinforcing element moves towards the other end edge of the carcass ply for the subsequent deposition of such reinforcing element.

Preferably, each arm slides on a respective slide firmly associated to the pick up device. This device allows the reinforcing element to be released from the cutting unit before moving it towards the respective end edge of the carcass ply.

Preferably, according to a preferred embodiment, a first motor unit adapted to drive the rotation of one of said arms around a longitudinal axis thereof is provided.

As to the cutting unit, it preferably comprises a pair of blades movable toward/away from each other.

More preferably, said apparatus further comprises a second motor unit adapted to drive in a synchronised manner the movement of the blades and the movement of the pick up device. The use of a single motor for both the above movements allows the desired synchronism between the cutting step of the reinforcing element and the movement step of such reinforcing element towards an end edge of the carcass ply to be achieved.

Preferably, the cutting unit is rotatable around respective rotation axis for adjusting the width of the cutting angle.

In the preferred embodiments of the present invention, each positioning member comprises at least one pair of articulated arms, each articulated arm comprising a first arm element having a first free end pivoted to a support frame and an opposite free end whereon a first free end of a second arm element is pivoted, the second arm element comprising, at an opposite free end thereof, a support member of the reinforcing element.

Preferably, the above support member comprises a plurality of flexible elements. Such flexible elements allows, thanks to their mobility, the adhesion of the reinforcing element on the curved surface of the forming support to be achieved.

More preferably, the above support member comprises a suction or suction cup or electromagnet holding device. This allows detaching the reinforcing element after it has been positioned on the end edge of the carcass ply. Advantageously, a suction or suction cup device is used when the cords inside the reinforcing element are made of a textile; in this case, the detachment takes place by the emission of an air blow. On the other hand, an electromagnet device is used when the above cords are made of metal; in this case, the detachment takes place by deactivating the electrical power supply to the device.

Preferably, the above support member is movable in a direction parallel to the pivoting direction of the above arm elements. This provision allows the reinforcing element to be deposited on the end edge of the carcass ply.

Preferably said apparatus further comprises a pair of pressing members, each at a respective articulation arm.

Preferably, said forming support is substantially cylindrical.

BRIEF DESCRIPTION OF THE DRAWINGS

Further features and advantages of the present invention will appear more clearly from the following detailed description of some preferred embodiments of an apparatus and process according to the present invention, made with reference to the annexed drawings. In such drawings.

DETAILED DESCRIPTION OF THE INVENTION

Figure 1:
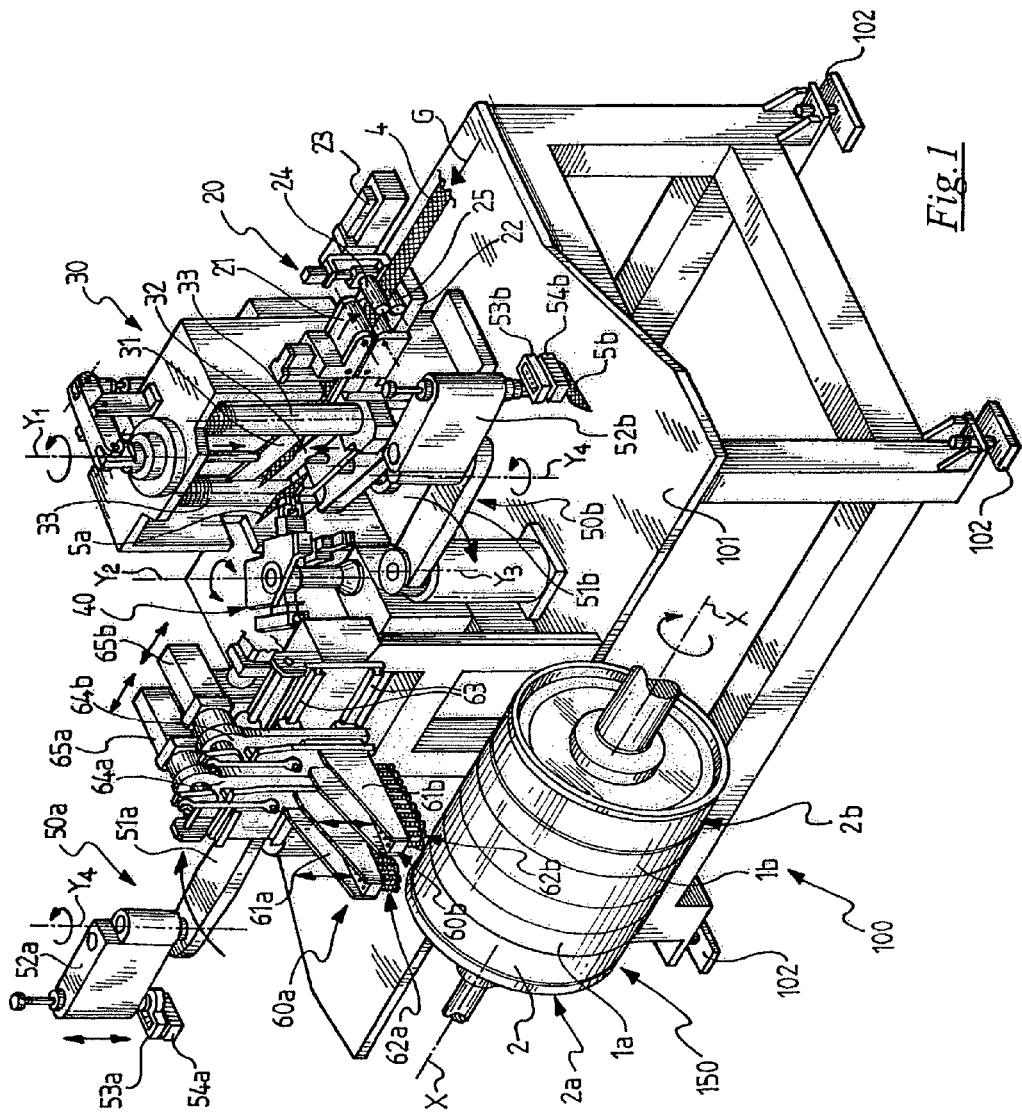
FIG. 1 is a perspective schematic view of an apparatus according to the present invention.

In FIG. 1, reference numeral 100 globally indicates an exemplifying embodiment of an apparatus for making at least one pair of opposite annular reinforcing structures 1a, 1b of the bead region of a tyre for vehicle wheels. Such apparatus allows carrying out a process according to the present invention.

In particular, apparatus 100 may be used in a process for manufacturing a tyre wherein the building steps of the carcass structure are carried out at least in part simultaneously with the steps of making the crown structure, the latter comprising at least one rim structure and preferably also a tread band. The carcass structure and the crown structure are made at respective separate work stations, from where the respective products must then come out with a time as synchronised as possible, so as to proceed with the subsequent step of assembling the crown structure on the carcass structure and then, with the subsequent steps of the process for manufacturing the tyre.

Apparatus 100 allows making a reinforcing structure 1a, 1b at a respective end edge 2a, 2b of a carcass ply 2 laying on a cylindrical forming support 150. The aforementioned end edges are defined at axial end zones of the ply 2 which are intended to define the bead region of the tyre.

The reinforcing structure 1, 1b is conveniently made directly on the forming support 150 in a step of building of a carcass structure. Such a building step comprises a step of laying on the forming support 150 the carcass ply 2 and then, the step of depositing on the carcass ply 2 one or more annular reinforcing structures 1a, 1b and one or more annular anchoring structures (not shown and also known as bead cores), the latter being intended to keep the tyre well fixed to the anchoring seat specifically provided in the rim of the wheel.

Apparatus 100 comprises a support frame 101 provided with respective floor support feet 102.

The forming support 150 is mounted on frame 101 of apparatus 100 between a mandrel and a center (not shown) in a totally conventional manner. It is moved in rotation about a respective rotation axis X-X, by a special moving device (not shown), with settable peripheral speed and angular positions, always in a conventional manner.

The structure of the forming support 150 is not described in detail herein since it can be made in any convenient manner by the man skilled in the art.

Each reinforcing structure 1a, 1b is defined by a predetermined number of reinforcing elements 5a, 5b (FIGS. 2-7) of the same length and width. Such reinforcing elements are deposited on the forming support 150 along substantially circular respective deposition paths defined on the opposite end edges 2a, 2b of the carcass ply 2. With reference to the annexed figures, the reinforcing elements 5a are deposited one after the other in a circumferential direction on the end edge 2a of the carcass ply 2 for forming the reinforcing structure 1a, while the reinforcing elements 5b are deposited one after the other in a circumferential direction on the end edge 2b of the carcass ply 2 for forming the reinforcing structure 1b.

In order to allow the sequential deposition in circumferential direction of the reinforcing elements 5a, 5b, the aforementioned moving device drives rotation of the forming support 150 about the rotation axis X-X thereof by an angle corresponding to a predetermined circumferential step.

The reinforcing elements 5a, 5b are obtained by operations for cutting to size at least one continuous reinforced band-like element 4 extending along a, longitudinal extension direction indicated in the annexed figures with G.

The continuous reinforced band-like element 4 has a defined and constant width, preferably comprised between 1 and 100 mm, more preferably between 30 and 50 mm.

The continuous reinforced band-like element 4 preferably comprises a plurality of reinforcing cords (not shown) of metal or textile material incorporated in a matrix of elastomeric material. Such reinforcing cords 6 extend parallel to one another along the longitudinal extension direction G of the continuous reinforced band-like element 4.

The continuous reinforced band-like element 4 is fed along the longitudinal extension direction G thereof by a special feeding device 20. Such device can comprise a device for in-line preparing the continuous reinforced band-like element 4, such as a drawing and/or calendering device, or a coil for gathering the continuous reinforced band-like element 4. In this last case the continuous reinforced band-like element 4 is prepared in a central system upstream of the coil.

By moving the continuous reinforced band-like element 4 by a predetermined pre-advance step, the feeding device 20 defines the cutting length of the continuous reinforced band-like element 4, which corresponds to the width of the reinforcing elements 5a, 5b when deposited on the forming support 150.

The feeding device 20 essentially consists of a pair of belts 21, 22, respectively upper and lower, closed in a ring and that surround as a sandwich the continuous reinforced band-like element 4. A motor 23 provided with an encoder drives the rotation of the lower belt 22, which carries the continuous reinforced band-like element 4 forward by the predetermined step. To ensure the movement of the continuous reinforced band-like element 4, the upper belt 21 is properly pushed against the continuous reinforced band-like element 4.

A pair of rollers 24, 25, mounted upstream of the pair of belts 21, 22 with reference to the advance direction of the continuous reinforced band-like element, monitors the thickness of the latter and, in the case of abnormal thickness (for example because of the presence of a too thick joint), sends a signal, to a special microprocessor that actuates a device for the removal of non conforming material.

Downstream of the feeding device 20, with reference to the advance direction of the continuous reinforced band-like element 4, a cutting unit 30 is provided. The cutting unit 30 is adapted to carry out the sequential operations of cutting to size the continuous reinforced band-like element 4 for sequentially obtaining the reinforcing elements 5a, 5b. The cutting unit 30 acts on the continuous reinforced band-like element 4 with a predetermined cutting frequency, along a cutting direction that, on the lying plane of the continuous reinforced band-like element 4, defines a predetermined cutting angle α with the longitudinal direction G of the continuous reinforced band-like element 4.

In the preferred embodiments of the process carried out by the apparatus 100, the cutting angle α is set to a value greater than zero, preferably comprised between about 15° and about 90°, more preferably between about 20° and about 50°.

When the cutting angle α is equal to 90°, the length of the reinforcing elements 5a, 5b deposited on the forming support 150 corresponds to the width of the continuous reinforced band-like element 4. When the cutting angle α is lower than 90°, the length of the reinforcing elements 5a, 5b is equal to the width of the continuous reinforced band-like element 4 divided the sine of angle α. Preferably, the length of the reinforcing elements 5a, 5b is in any case comprised between 1 mm and 100 mm, more preferably between 30 mm and 60 mm.

The cutting unit 30 comprises a pair of blades 31 and 32, respectively upper and lower, mounted on a pair of opposite uprights 33. The blades 31, 32 are moved in a mechanical manner, for example by a cam system, not shown. A mechanical movement of this type allows a perfect synchronism of the blades in their movement toward/away from each other to be ensured.

The movement of blades 31, 32 is driven by a special motor unit (not shown in the annexed figures).

The cutting unit 30 is pivoted to frame 101 around a respective rotation axis $Y_1$ and can rotate as a whole around such axis for allowing the cut of the continuous reinforced band-like element 4 with different angles.

Downstream of the cutting unit 30, that is, between the cutting unit 30 and the forming support 150, a pick up device 40 of the reinforcing elements 5a, 5b is provided.

As better shown in FIGS. 2-7, the pick up device 40 comprises a pair of pick up members, each comprising an arm 41a, 41b sliding on a respective slide 42a, 42b firmly associated to the pick up device 40, so as to obtain a linear sliding movement of arms 41a, 41b along the respective longitudinal directions. Such movement allows the release of the reinforcing element 5a, 5b from the cutting unit 30.

Each arm 41a, 41b comprises, at a free end thereof, pliers 43a, 43b for picking up the reinforcing element 5a, 5b.

Arms 41a, 41b are rigidly connected to one another and angularly spaced by a predetermined angle, preferably equal to 90°.

Figure 5:
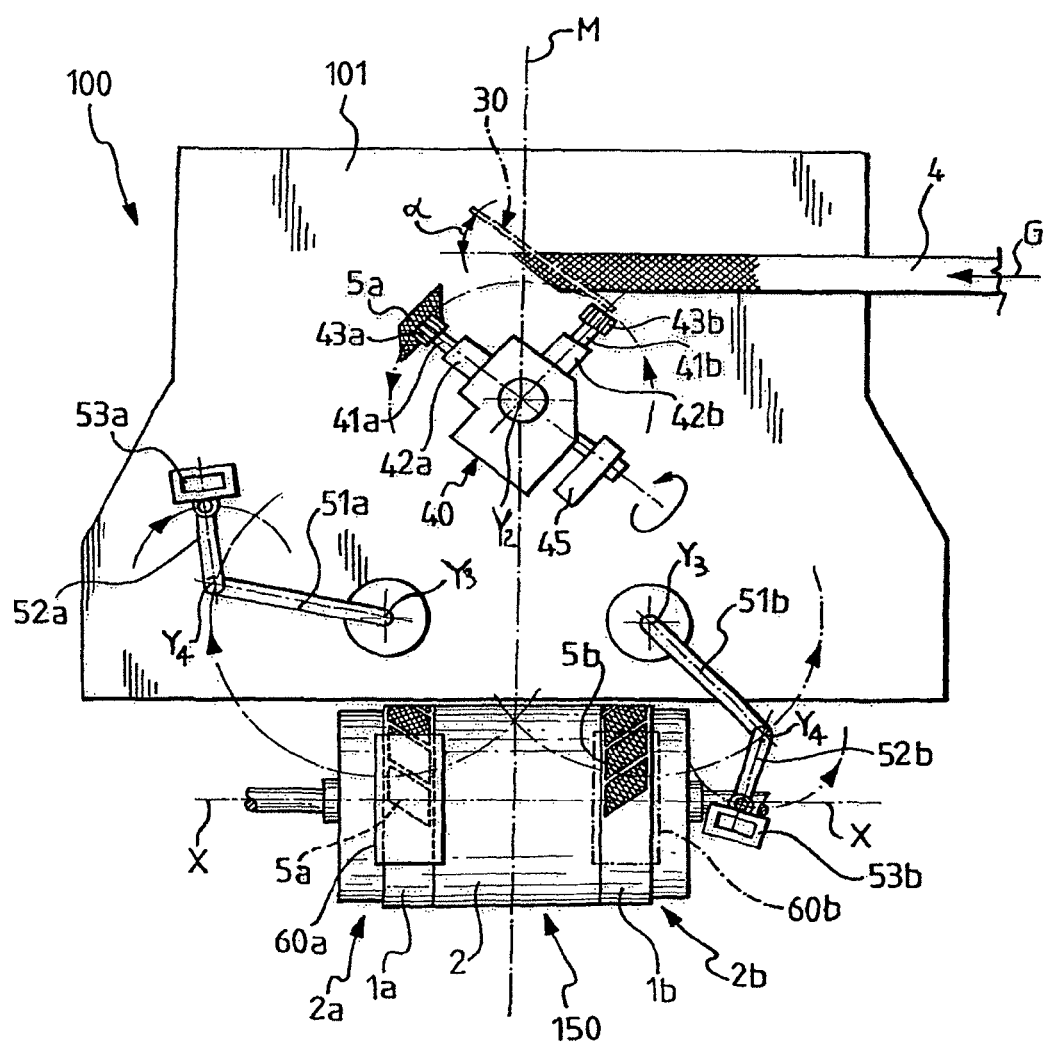
FIG. 5 is a simplified schematic plan view of the apparatus of FIG. 1 in a fourth step of the process according to the present invention.

One of the two arms (in the example shown in the annexed figures, arm 41a) is further rotatable about the longitudinal axis thereof (as shown in FIG. 5) for obtaining a tilting by 180° of the reinforcing element 5a associated thereto. Such motion is driven by a motor unit 45 mounted on a free end of arm 41a.

The pick up device 40 is pivoted to the frame 101 around a respective rotation axis $Y_2$ defined at a middle plane M of the apparatus 100. The pick up device 40 may rotate about such axis in both directions of rotation with an alternating movement, so as to move in an alternating sequence the reinforcing elements 5a towards the first end edge 2a of the carcass ply 2 and the reinforcing elements 5b towards the end edge 2b of the carcass ply 2. Preferably, the reinforcing elements 5a, 5b, are respectively moved towards positioning members 50a and 50b as is better described hereinafter. Such movement, which preferably is by 90°, is driven by the same motor unit that drives the movement (up/down) of blades 31, 32.

As mentioned above, apparatus 100 further comprises, between the pick up device 40 and the forming support 150, a pair of positioning members 50a, 50b, each intended to take a respective reinforcing element 5a, 5b from the respective arm 41a, 41b of the pick up device 40 after such arm has made an angular movement by 90° starting from the cutting unit 30.

As shown in FIGS. 2-7, the positioning members 50a, 50b are preferably arranged symmetrically at opposite side with respect to the middle plane M of the apparatus 100.

Always with reference to FIGS. 2-7, each positioning member 50a, 50b comprises a respective articulated arm in turn comprising a first arm element 51a, 51b having a free end pivoted on the frame 101 at a pivoting axis $Y_3$, and a second arm element 52a, 52b having a free end pivoted at a pivoting axis thereof $Y_4$ at a free end of the respective first arm element 51a, 52a opposite that of pivoting to frame 101.

Each second arm element 52a, 52b comprises, at a free end thereof opposite that of pivoting to the first arm element 51a, 51b, a respective support member 53a, 53b adapted to pick up the respective reinforcing element 5a, 5b from the respective arm 41a, 41b of the pick up device 40 for moving it at the respective end edge 2a, 2b of the carcass ply 2.

Each support member 53a, 53b is provided with a plurality of flexible elements 54a, 54b (FIG. 1) adapted to support the reinforcing element 5a, 5b during the movement towards the forming support 150 and to ensure good positioning of the reinforcing elements 5a, 5b on the end edges 2a, 2b of the carcass ply 2. The reinforcing elements 5a, 5b, once deposited, remain associated to the carcass ply by adhesion.

Each support member 53a, 53b is further provided with a device for holding the reinforcing element 5a, 5b by suction or suction cup or electromagnet (according to whether the reinforcing cords inside the reinforcing elements are textile or metal), intended to prevent the reinforcing element 5a, 5b from falling during the movement towards the forming support 150.

As shown in FIG. 1, each support member 53a, 53b is mobile parallel to the pivoting axes $Y_3$ and $Y_4$ for allowing the deposition of the reinforcing elements 5a, 5b on the forming support 150.

The deposition apparatus 100 further comprises, downstream of the positioning members 50a, 50b, that is, between the positioning members 50a, 50b and the forming support 150, a pair of pressing members 60a, 60b.

As shown in FIGS. 2-7, the pressing members 60a, 60b are arranged opposite the middle plane M of apparatus 100, each, at a respective positioning member 50a, 50b.

Each pressing member 60a, 60b is intended to press the reinforcing element 5a, 5b on the forming support 150, so as to improve the adhesion of such reinforcing element 5a, 5b on the respective end edge 2a, 2b of the carcass ply 2.

To this end, as shown in FIG. 1, each pressing member 60a, 60b consists of an arm 61a, 61b substantially shaped as an L and having, on the side of the L facing the forming support 150, a plurality of spring elements 62a, 62b adapted to match the curved surface of the forming support 150 when the reinforcing elements 5a, 5b are deposited. This ensures the complete adhesion of the support elements 5a, 5b to the carcass ply 2.

The other side of the L of each arm 61a, 61b of the pressing members 60a, 60b is mounted on a pair of guides 63 extending parallel to the rotation axis X-X of the forming support 150.

Each of the pressing members 60a, 60b is further movable in a direction perpendicular to the rotation axis X-X of the forming support 150, for example by a respective eccentric system 64a, 64b provided on the portion of arms 61a, 61b coupled to guides 63. Such movement is driven by respective motor units 65a, 65b associated each to a respective arm 61a, 61b at the side of the portion coupled to guides 63.

With reference to FIGS. 2-7, a preferred embodiment of the process for making the reinforcing structures 1a, 1b that can be carried out by the deposition apparatus 100 described above will now be described.

FIGS. 2-7 show the process steps of the present invention in a running condition. Before carrying out the above process, the forming support 150 is mounted on the frame 101 and apparatus 100 is set up according to the features of the tyre to be manufactured. Set up of the apparatus 100 comprises positioning of the cutting unit 30 at the desired cutting angle α with respect to the longitudinal direction G of the continuous reinforced band-like element 4 and positioning of the pressing members 60a, 60b at the correct radial and axial positions.

As already stated, in the process of the present invention the reinforcing elements 5a, 5b are cut in a sequence from the continuous reinforced band-like element 4 and alternately deposited each on a respective end edge 2a, 2b of the carcass ply 2. In particular, the deposition of a reinforcing element 5b on the end edge 2b takes place immediately after deposition of a reinforcing element 5a on the end edge 2a and vice versa, so as to make the reinforcing structure 1a on the end edge 2a while the reinforcing structure 1b is made on the end edge 2b.

At the running state, therefore, there is a situation wherein at least one reinforcing element 5a has already been deposited on the end edge 2a and at least one reinforcing element 5b has already been deposited on the end edge 2b.

The process of the present invention is described hereinafter starting from this situation.

Figure 2:
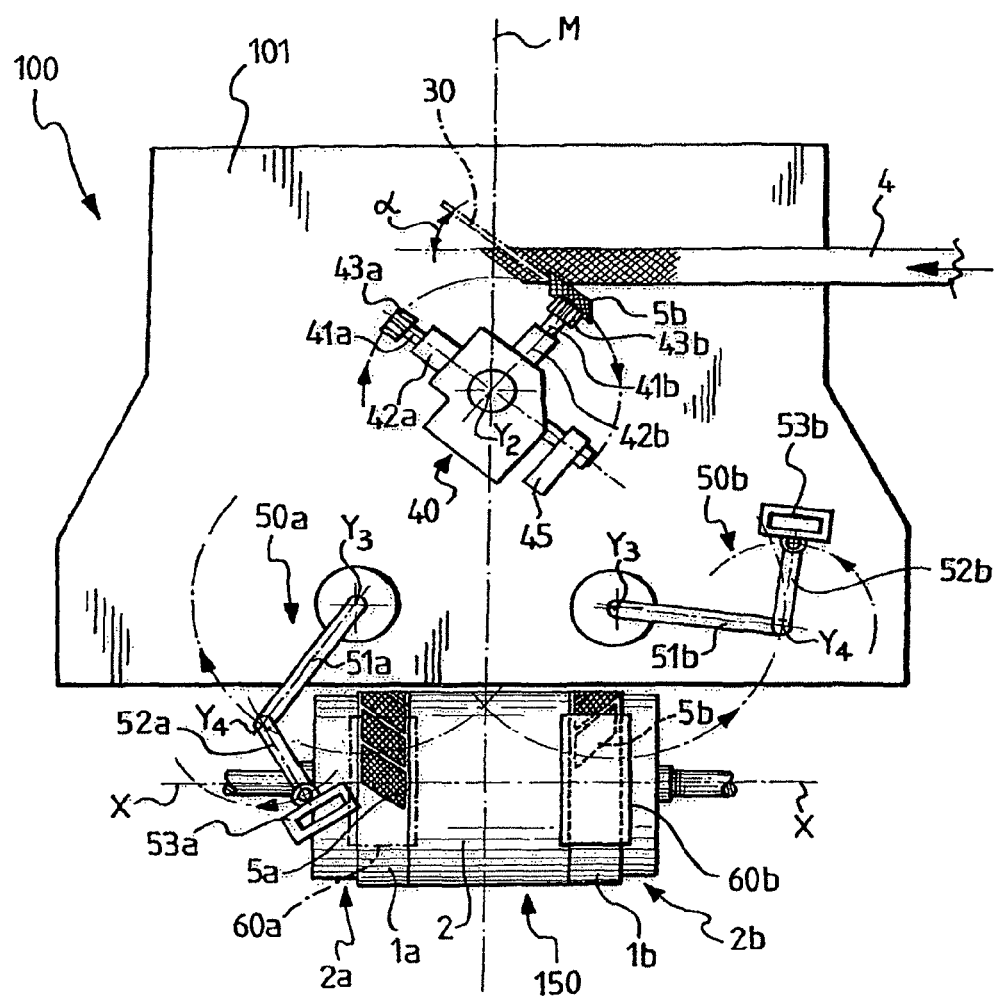
FIG. 2 is a simplified schematic plan view of the apparatus of FIG. 1 in a first step of the process according to the present invention.
Figure 3:
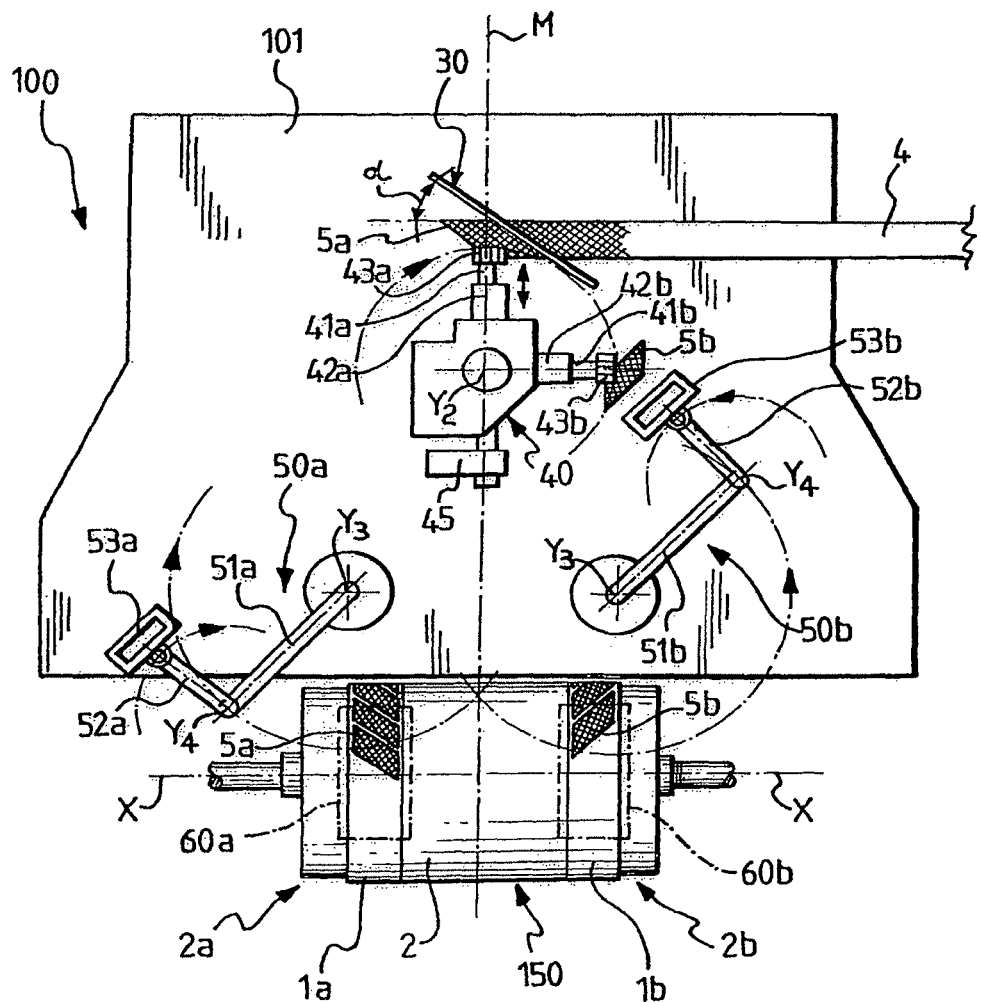
FIG. 3 is a simplified schematic plan view of the apparatus of FIG. 1 in a second step of the process according to the present invention.

FIG. 2 shows a step wherein the continuous reinforced band-like element 4 is advancing by a predetermined step along the above longitudinal direction G; during such advance, the blades of the cutting unit 30 open and the pick up device 40 is made to rotate in clockwise direction so as to move arm 41a at the cutting unit 30, that is, in the position of FIG. 3. The cutting unit 30 with the blades in open position is indicated in FIG. 2 with a broken line.

As shown in FIG. 2, simultaneously with the rotation in clockwise direction of the pick up device 40, a rotation in clockwise direction of the positioning member 50a occurs. Indeed the positioning member 50a has just deposited a previously cut reinforcing element 5a on the forming support 150 and moves away from the forming support 150 toward the operating position shown in FIG. 6. The rotation of the positioning member 50a comprises a rotation in clockwise direction of arm element 51a about axis $Y_3$ and a concurrent rotation in clockwise direction of arm element 52a about axis $Y_4$, as shown by the circular broken lines in FIGS. 2-6.

Moreover, while the pick up device 40 and the positioning member 50a rotate in clockwise direction, the pressing member 60a is in rest position, that is, it is kept raised with respect to the forming support 150. The pressing member 60a in such rest position is shown in FIG. 2 with a broken line.

Always in FIG. 2 it can be seen that while arm 41a rotates in clockwise direction, arm 41b also rotates in clockwise direction, moving away from the cutting unit 30 where it has just picked up a reinforcing element 5b. Such reinforcing element 5b has been released by the cutting unit 30 thanks to the linear movement of arm 41b along the longitudinal axis thereof. In this way, the reinforcing element 5b is moved away from the cutting unit 30 toward the operating position, shown in FIG. 3, rotated by 90° with respect to the initial position wherein arm 41b has picked up the reinforcing element 5b from the cutting unit 30.

Simultaneously with these steps, the positioning member 50b rotates in counter clockwise direction to move toward the operating position shown in FIG. 3. The rotation of the positioning member 50b comprises a rotation in counter clockwise direction of arm element 51b about axis $Y_3$ and a concurrent rotation in counter clockwise direction of arm element 52b about axis $Y_4$, as shown by the circular broken lines in FIGS. 2 and 3. The pressing member 60b in this step is in operating position, that is, it presses a previously deposited reinforcing element 5b on the forming support 150. The pressing member 60b in such operating position is shown in FIG. 2 with a solid line.

Afterwards, as shown in FIG. 3, a reinforcing element 5b is picked up by the pick up device 40 at the cutting unit 30.

In particular, pliers 43a of arm 41a pick up the continuous reinforced band-like, element 4 at the free end thereof downstream of blades 31, 32 of the cutting unit 30. Once this has taken place, blades 31, 32 close up for cutting the continuous reinforced band-like element 4, thus obtaining a reinforcing element 5a. The cutting unit 30 with the blades in closed position is indicated in FIG. 3 with a solid line.

FIG. 3 shows how simultaneously with the cutting of the reinforcing element 5a, arm 41b of the pick up device 40 transfers the previously cut reinforcing element 5b to the support element 53b of the positioning member 50b, thus starting the step of positioning of the reinforcing element 5b on the end edge 2b of the carcass ply 2. The pressing members 60a and 60b in this step are in rest position (both shown in FIG. 3 with a broken line) and the positioning device 50a continues to move towards the operating position thereof shown in FIG. 6.

Figure 4:
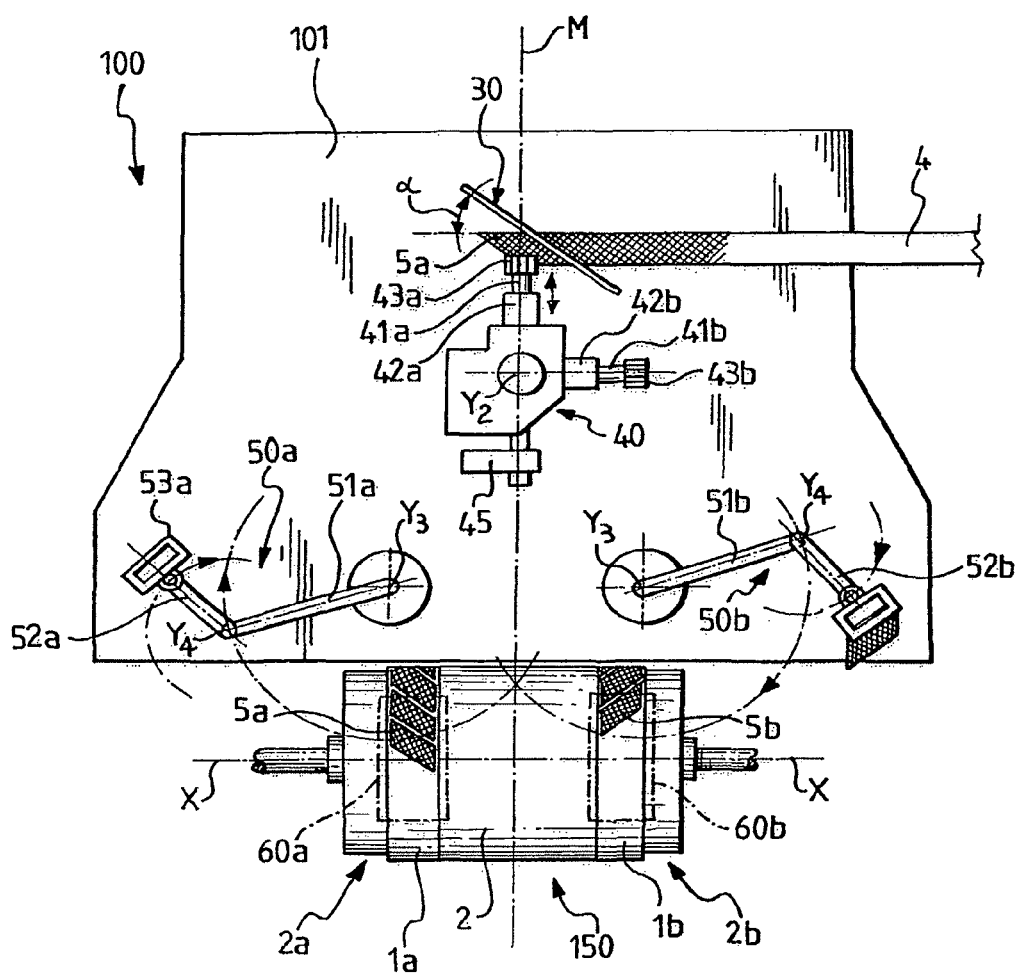
FIG. 4 is a simplified schematic plan view of the apparatus of FIG. 1 in a third step of the process according to the present invention.

FIG. 3 shows an initial part of the cutting step of the reinforcing element 5a, while FIG. 4 shows a final part of such cutting step.

FIG. 4 shows how, while the pick up device 40 is still in the operating position of FIG. 3, the positioning member 50b rotates in clockwise direction to bring on the second end edge 2b of the carcass ply 2 the reinforcing element 5b just left by the pick up device 40. The rotation of the positioning member 50b comprises a rotation in clockwise direction of arm element 51b about axis $Y_3$ and a concurrent rotation in clockwise direction of arm element 52b about axis $Y_4$, as shown by the circular broken lines in FIG. 4.

Figure 6:
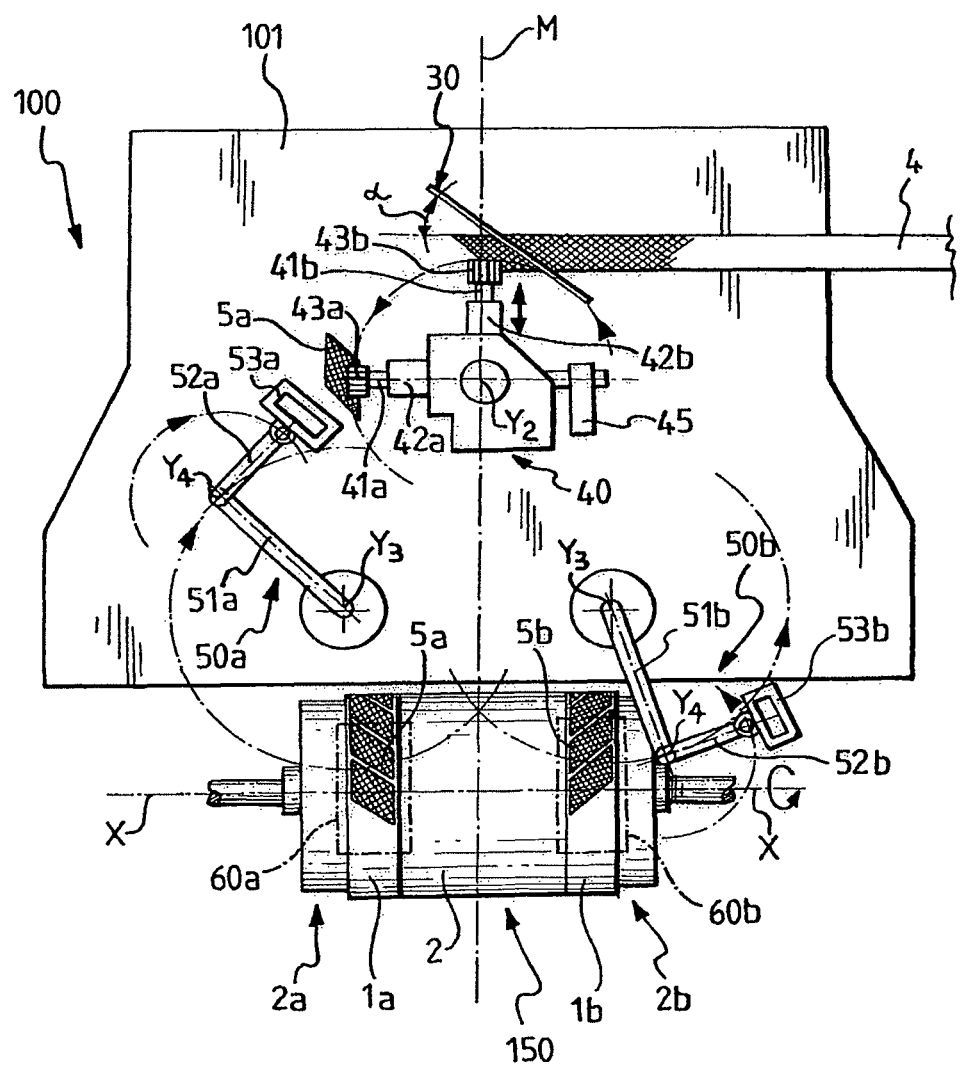
FIG. 6 is a simplified schematic plan view of the apparatus of FIG. 1 in a fifth step of the process according to the present invention.

Meanwhile, the positioning member 50a continues to move towards the operating position of FIG. 6 to take a reinforcing element 5a from the pick up device 40.

In a subsequent step, shown in FIG. 5, the reinforcing element 5a is released from the cutting unit 30 thanks to the linear movement of arm 41a along the longitudinal axis thereof and the pick up device 40 is made to rotate in counter clockwise direction about axis $Y_2$. In this way, the reinforcing element 5a is moved away from the cutting unit toward the operating position, shown in FIG. 6, rotated by 90° with respect to the position of FIGS. 3 and 4.

During this movement, arm 41a is rotated by 180° around the respective longitudinal axis, so as to substantially overturn the reinforcing element 5a.

Meanwhile, the continuous reinforced band-like element 4 is made to advance by a predetermined step along the above longitudinal direction G; during such advance, the blades of the cutting unit 30 open up. The cutting unit 30 with the blades in open position is indicated in FIG. 2 with a broken line.

Simultaneously with these steps, arm 41b of the pick up device 40, having already transferred the reinforcing element 5b to the positioning member 50b, moves toward the cutting unit 30, that is, in the position of FIG. 6, to pick up a new reinforcing element 5b.

Meanwhile, as shown in FIG. 5, the movement of the positioning member 50a towards the operating position shown in FIG. 6 continues.

Moreover, simultaneously with the rotation in counter clockwise direction of the pick up device 40, a rotation in counter clockwise direction of the positioning member 50b occurs. Indeed the positioning member 50b has just deposited on the forming support 150 a previously cut reinforcing element 5b and moves away from the forming support 150 toward the operating position shown in FIG. 3. In this step, the pressing member 60a is in operating position, that is, it presses on the forming support 150 a previously deposited reinforcing element 5a; such operating position is shown in FIG. 5 with a solid line. The pressing member 60b, on the other hand, is in rest position (shown in FIG. 5 with a broken line).

In a subsequent step, shown in FIG. 6, a reinforcing element 5b is picked up by the pick up device 40 at the cutting unit 30.

In particular, pliers 43b of arm 41b pick up the continuous reinforced band-like element 4 at the free end thereof downstream of blades 31, 32 of the cutting unit 30. Once this has taken place, blades 31, 32 close up for cutting the continuous reinforced band-like element 4, thus obtaining a reinforcing element 5b. The cutting unit 30 with the blades in closed position is indicated in FIG. 6 with a solid line.

FIG. 6 shows how simultaneously with the cutting of the reinforcing element 5b, arm 41a of the pick up device 40 transfers the previously cut reinforcing element 5a to the support element 53a of the positioning member 50a, thus starting the step of positioning of the reinforcing element 5a on the end edge 2a of the carcass ply 2. The pressing members 60a and 60b in this step are in rest position (both shown in FIG. 6 with a broken line) and the positioning device 50a continues to move towards the operating position thereof shown in FIG. 6.

Simultaneously with an initial part of the step of positioning the reinforcing element 5a, the forming support 150 is made to rotate by a predetermined angle corresponding to a movement in circumferential direction by a distance having a length equal to (if the circumferentially consecutive reinforcing elements 5a, 5b must be deposited in contact and without overlapping) or greater than (if the reinforcing elements 5a, 5b must be deposited leaving a free space between two circumferentially consecutive reinforcing elements) the pre-advance step of the continuous reinforced band-like element 4.

Figure 7:
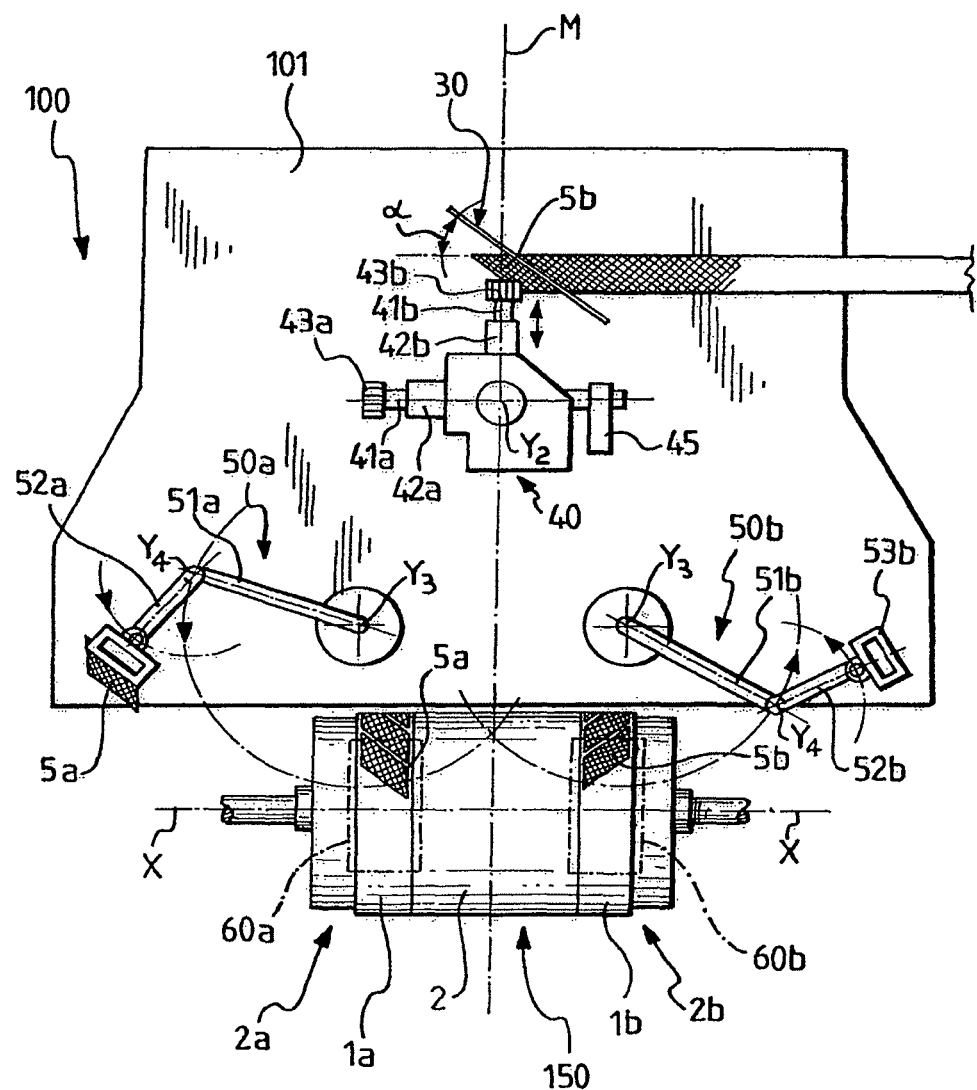
FIG. 7 is a simplified schematic plan view of the apparatus of FIG. 1 in a sixth step of the process according to the present invention.

FIG. 6 shows an initial part of the cutting step of the reinforcing element 5b, while FIG. 7 shows a final part of such cutting step.

FIG. 7 shows how, while the pick up device 40 is still in the operating position of FIG. 6, the positioning member 50a rotates in counter clockwise direction to bring on the first end edge 2a of the carcass ply 2 the reinforcing element 5a just left by the pick up device 40. The rotation of the positioning member 50a comprises a rotation in counter clockwise direction of arm element 51a about axis $Y_3$ and a concurrent rotation in counter clockwise direction of arm element 52a about axis $Y_4$, as shown by the circular broken lines in FIG. 7.

Meanwhile, the positioning member 50b continues to move towards the operating position of FIG. 3 to take a new reinforcing element 5b from the pick up device 40.

The pressing members 60a and 60b in this step are in rest position (both shown in FIG. 7 with a broken line).

In a subsequent step (not shown), the positioning device 50a deposits the reinforcing element 5a on the end edge 2a of the carcass ply 2. The situation shown in FIG. 2 takes occurs again and the process continues cyclically as described above until the reinforcing structures 1a and 1b are completed on the opposite end edges 2a, 2b of the carcass ply 2.

It is clear from the above description that the process and the apparatus described above, making simultaneously the reinforcing structures on the two opposite end edges of the carcass ply, allow achieving an advantageous reduction of the overall time for making such structures, and thus, of the overall time for manufacturing the tyre.

It is clear that a man skilled in the art may make further changes and modifications to the invention described above in order to meet specific and contingent application needs, such changes and modifications in any case falling within the scope of protection defined by the following claims.

For example, the step of pressing the reinforcing elements 5a may be carried out during the positioning of the reinforcing elements 5b. Likewise, the step of pressing the reinforcing elements 5b may occur during the positioning of the reinforcing elements 5a. Moreover, the rotation of the forming support 150 may take place any time between the above pressing steps, provided that at that time the reinforcing elements 5a, 5b are not being deposited on the forming support 150.

The invention claimed is:

1. An apparatus for deposition of an annular reinforcing structure in a building step of a carcass structure of a tyre for vehicle wheels, the carcass structure comprising a carcass ply with associated annular anchoring structures, one at each axially opposite end, said carcass ply laying on a forming support, comprising:
- a device for feeding a continuous reinforced band-like element;
- a cutting unit of the continuous reinforced band-like element;
- a device for picking up reinforcing elements cut to size from the continuous reinforced band-like element, the pick up device being configured to alternately move clockwise and counterclockwise around a pick up axis and comprising a first arm and a second arm, the first arm being configured to move a first reinforcing element from the cutting unit toward a first end edge of the carcass ply when the pick up device moves clockwise around the pick up axis, and the second arm configured to move a second reinforcing element from the cutting unit toward a second end edge of the carcass ply axially opposite said first end edge when the pick up device moves counterclockwise around the pick up axis;
- a first positioning member pivotably movable between the pick up device and the first end edge of the carcass ply around a first-positioning axis parallel to the pick up axis, the first positioning member being adapted to take the first reinforcing element from the pick up device, pivot around the first-positioning axis, and deposit the first reinforcing element on the first end edge of the carcass ply; and
- a second positioning member pivotably movable between the pick up device and the second end edge of the carcass ply around a second-positioning axis parallel to the pick up axis, the second positioning member being adapted to take the second reinforcing element from the pick up device, pivot around the second-positioning axis, and deposit the second reinforcing element on the second end edge of the carcass ply.

2. The apparatus according to claim 1, wherein the two arms of the pick up device are connected to one another with an angularly fixed orientation.

3. The apparatus according to claim 2, wherein said orientation is perpendicular.

4. The apparatus according to claim 2, wherein each arm slides on a respective slide firmly associated with the pick up device.

5. The apparatus according to claim 2, comprising a motor adapted to drive a rotation of one of said arms around a longitudinal axis thereof.

6. The apparatus according to claim 1, wherein the cutting unit comprises a pair of blades movable toward/away from one another.

7. The apparatus according to claim 6, further comprising a motor adapted to drive in a synchronized manner the movement of the blades and the movement of the pick up device.

8. The apparatus according to claim 1, wherein the cutting unit is rotatable about a respective rotation axis for adjusting the cutting angle with respect to the reinforced band-like element.

9. The apparatus according to claim 1, wherein each positioning member comprises a pair of articulated arms, each articulated arm comprising a first arm element having a first end pivoted to a support frame and an opposite end pivoted to a second arm element, the second arm element comprising a support member of one of the reinforcing elements.

10. The apparatus according to claim 9, wherein said support member for each positioning member comprises a plurality of flexible elements.

11. The apparatus according to claim 9, wherein said support member for each positioning member comprises a suction or suction cup or electromagnet holding device.

12. The apparatus according to claim 9, wherein said support member for each positioning member is movable along a plane parallel to a pivoting plane of said first and second arm elements.

13. The apparatus according to claim 9, further comprising a pair of pressing members, each pressing member being associated with a respective articulated arm.

14. The apparatus according to claim 13, wherein each pressing member comprises a plurality of spring elements.

15. The apparatus according to claim 13, wherein each pressing member is movable along a direction perpendicular to a rotation axis of the forming support.

16. The apparatus according to claim 13, wherein each pressing member is movable along a direction parallel to a rotation axis of the forming support.

17. The apparatus according to claim 1, wherein said forming support is cylindrical.

* * * * *